US008209950B2

(12) United States Patent
Jain et al.

(10) Patent No.: US 8,209,950 B2
(45) Date of Patent: Jul. 3, 2012

(54) DETECTING ICE BUILDUP ON AN AIRCRAFT ENGINE AND ACTUATING THE TURBOFAN EXIT NOZZLE TO BREAK THE ICE

(75) Inventors: Ashok K. Jain, Tempe, AZ (US); Michael Winter, New Haven, CT (US)

(73) Assignee: United Technologies Corporation, Hartford, CT (US)

( * ) Notice: Subject to any disclaimer, the term of this patent is extended or adjusted under 35 U.S.C. 154(b) by 678 days.

(21) Appl. No.: 12/441,587

(22) PCT Filed: Oct. 12, 2006

(86) PCT No.: PCT/US2006/039946
§ 371 (c)(1),
(2), (4) Date: Mar. 17, 2009

(87) PCT Pub. No.: WO2008/045065
PCT Pub. Date: Apr. 17, 2008

(65) Prior Publication Data
US 2010/0043390 A1    Feb. 25, 2010

(51) Int. Cl.
*F02G 3/00* (2006.01)
(52) U.S. Cl. ........ 60/39.093; 60/226.1; 60/242; 60/771; 239/265.39; 244/134 R
(58) Field of Classification Search ............... 60/39.093, 60/226.1, 242, 771; 239/265.39; 244/134 R
See application file for complete search history.

(56) References Cited

U.S. PATENT DOCUMENTS

| 2,135,119 | A | * | 11/1938 | Wood ........................ 244/134 A |
| 3,979,903 | A | | 9/1976 | Hull, Jr. et al. |
| 4,129,984 | A | * | 12/1978 | Nelson ....................... 60/39.093 |
| 4,782,658 | A | * | 11/1988 | Perry ........................... 60/226.1 |
| 4,825,644 | A | * | 5/1989 | Bubello et al. ............. 60/39.091 |
| 4,831,819 | A | * | 5/1989 | Norris et al. ............... 60/39.093 |
| 5,005,015 | A | * | 4/1991 | Dehn et al. .................... 340/962 |
| 5,282,719 | A | * | 2/1994 | McCarty et al. .................. 416/1 |
| 5,782,431 | A | * | 7/1998 | Gal-Or et al. ................... 244/52 |
| 7,175,136 | B2 | * | 2/2007 | Shah et al. ................ 244/134 R |
| 7,921,632 | B2 | * | 4/2011 | Jacquet-Francillon et al. ........................ 60/39.093 |

FOREIGN PATENT DOCUMENTS

| EP | 1 241 335 | 9/2002 |
| GB | 2 254 661 | 10/1992 |

OTHER PUBLICATIONS

International Search Report for PCT Application No. PCT/US06/39946, Jul. 4, 2007.

* cited by examiner

*Primary Examiner* — Ehud Gartenberg
*Assistant Examiner* — Michael B Mantyla
(74) *Attorney, Agent, or Firm* — Carlson, Gaskey & Olds, P.C.

(57) ABSTRACT

A turbofan engine deicing system includes a core nacelle (12) housing a turbine. A turbofan (20) is arranged upstream from the core nacelle. A controller (50) manipulates the turbofan in response to detecting an icing condition for avoiding undesired ice buildup on the turbofan engine (10) and nacelle parts. In one example, a variable area nozzle (40) is actuated to generate pressure pulses or a surge condition to break up any ice buildup. The icing condition can be determined by at least one sensor (52) and/or predicted based upon icing conditions schedules.

16 Claims, 2 Drawing Sheets

DETECTING ICE BUILDUP ON AN AIRCRAFT ENGINE AND ACTUATING THE TURBOFAN EXIT NOZZLE TO BREAK THE ICE

This application claims priority to PCT Application Serial No. PCT/US2006/039946, filed on Oct. 12, 2006.

BACKGROUND OF THE INVENTION

This invention relates to a deicing system for use with, for example, a turbofan engine.

During icy conditions, ice may build up on static and rotating components of the aircraft engine unless preventative measures are taken. Ice buildup causes propulsion system operability, safety and performance difficulties. Different techniques, such as anti-icing and deicing systems, can cause efficiency losses as well as a need for larger safety and operability margins to keep the propulsion system operational during icing conditions. These techniques result in an increase in system weight and fuel burn.

One example anti-icing system relies upon hot compressor bleed air, which can result in up to several percent fuel burn debit during its brief usage. Electrical heaters have also been employed, but are undesirable because they extract power from the engine. Specialty coatings have also been used to prevent icing, but are typically costly and deteriorate over time. Deicing systems are employed after ice formation and typically require an undesirably large amount of energy to actuate and break off ice accumulation.

What is needed is an ice preventative system that does not increase the weight of the engine or result in increased fuel burn and reduced operability of the engine.

SUMMARY OF THE INVENTION

A turbofan engine deicing system includes a core nacelle housing a turbine. A turbofan is arranged upstream from the core nacelle. A controller manipulates the turbofan in response to detecting an icing condition for avoiding undesired ice buildup on the turbofan engine and nacelle parts. In one example, a control device is commanded by the controller in response to the icing condition. In one example, the control device includes a variable area nozzle that is actuated to generate pressure pulses or a surge condition to break up any accumulated ice. The icing condition can be determined by at least one sensor and/or predicted based upon icing conditions schedules.

These and other features of the present invention can be best understood from the following specification and drawings, the following of which is a brief description.

DETAILED DESCRIPTION OF THE PREFERRED EMBODIMENT

Figure 1:
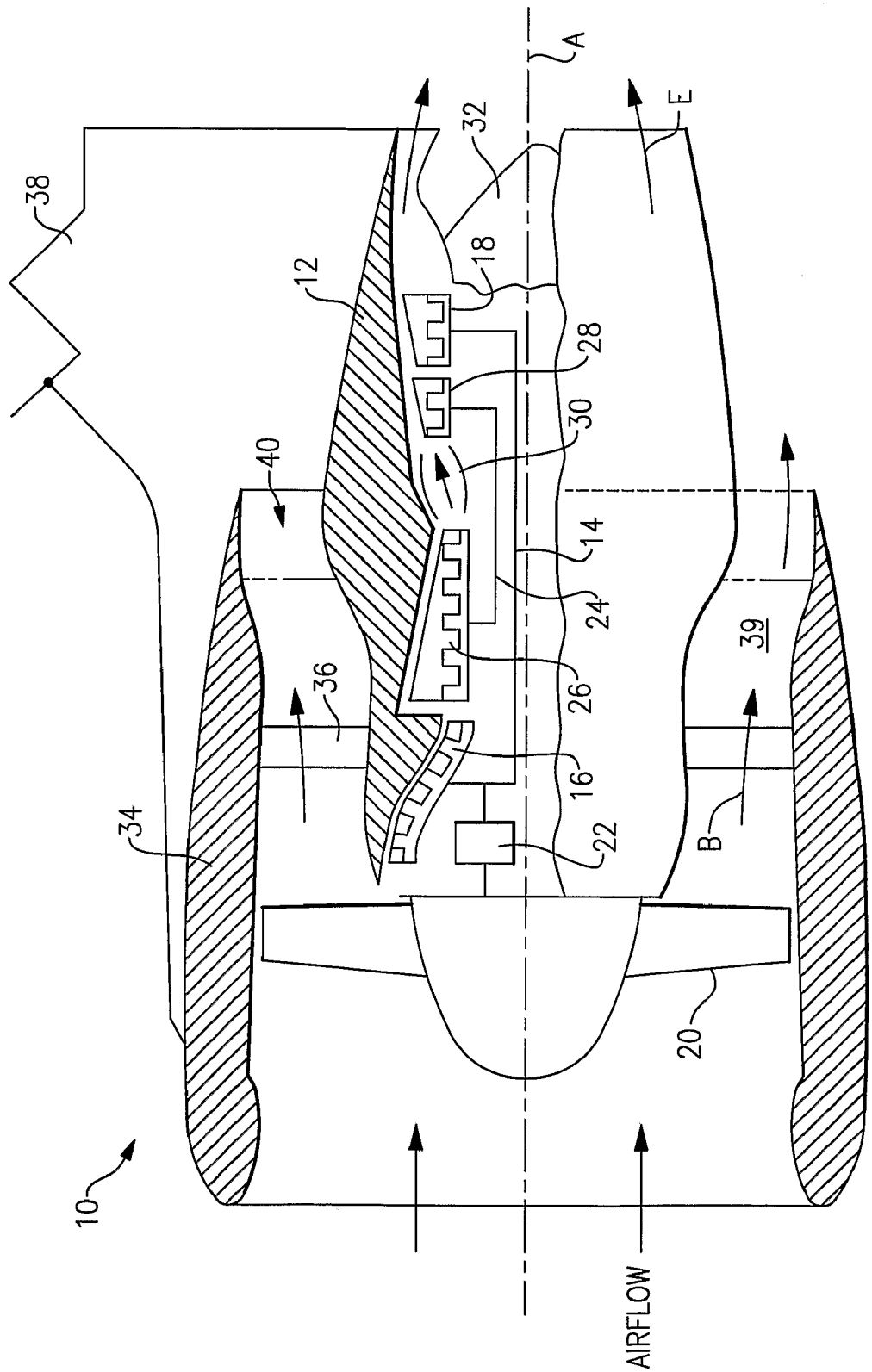
FIG. 1 is a cross-sectional view of an example geared turbofan engine.

A geared turbofan engine 10 is shown in FIG. 1. A pylon 38 secures the engine 10 to an aircraft. The engine 10 includes a core nacelle 12 that houses a low spool 14 and high spool 24 rotatable about an axis A. The low spool 14 supports a low pressure compressor 16 and low pressure turbine 18. In the example, the low spool 14 drives a turbofan 20 through a gear train 22. The high spool 24 supports a high pressure compressor 26 and high pressure turbine 28. A combustor 30 is arranged between the high pressure compressor 26 and high pressure turbine 28. Compressed air from compressors 16, 26 mixes with fuel from the combustor 30 and is expanded in turbines 18, 28.

In the examples shown, the engine 10 is a high bypass turbofan arrangement. In one example, the bypass ratio is greater than 10:1, and the turbofan diameter is substantially larger than the diameter of the low pressure compressor 16. The low pressure turbine 18 has a pressure ratio that is greater than 5:1, in one example. The gear train 22 is an epicycle gear train, for example, a star gear train, providing a gear reduction ratio of greater than 2.5:1. It should be understood, however, that the above parameters are only exemplary of a contemplated geared turbofan engine. That is, the invention is applicable to other engines including direct drive turbofans.

Airflow enters a fan nacelle 34, which surrounds the core nacelle 12 and turbofan 20. The turbofan 20 directs air into the core nacelle 12, which is used to drive the turbines 18, 28, as is known in the art. Turbine exhaust E exits the core nacelle 12 once it has been expanded in the turbines 18, 28, in a passage provided between the core nacelle and a tail cone 32.

The core nacelle 12 is supported within the fan nacelle 34 by structure 36, which are commonly referred to as upper and lower bifurcations. A generally annular bypass flow path 39 is arranged between the core and fan nacelles 12, 34. The example illustrated in FIG. 1 depicts a high bypass flow arrangement in which approximately eighty percent of the airflow entering the fan nacelle 34 bypasses the core nacelle 12. The bypass flow B within the bypass flow path 39 exits the fan nacelle 34 through a nozzle exit area 40.

For the engine 10 shown in FIG. 1, a significant amount of thrust may be provided by the bypass flow B due to the high bypass ratio. Thrust is a function of density, velocity and area. One or more of these parameters can be manipulated to vary the amount and direction of thrust provided by the bypass flow B. In one example, the engine 10 includes a structure associated with the nozzle exit area 40 to change the physical area and geometry to manipulate the thrust provided by the bypass flow B. However, it should be understood that the nozzle exit area may be effectively altered by other than structural changes, for example, by altering the boundary layer, which changes the flow velocity. Furthermore, it should be understood that any device used to effectively change the nozzle exit area is not limited to physical locations near the exit of the fan nacelle 34, but rather, includes altering the bypass flow B at any suitable location.

The engine 10 has a flow control device 41 that is used to effectively change the nozzle exit area. In one example, the flow control device 41 provides the fan nozzle exit area 40 for discharging axially the bypass flow B pressurized by the upstream turbofan 20 of the engine 10. A significant amount of thrust is provided by the bypass flow B due to the high bypass ratio. The turbofan 20 of the engine 10 is typically designed for a particular flight condition, typically cruise at 0.8M and 35,000 feet. The turbofan 20 is designed at a particular fixed stagger angle for an efficient cruise condition. The flow control device 41 is operated to vary the nozzle exit area 40 to adjust fan bypass air flow such that the angle of attack or incidence on the fan blade is maintained close to design incidence at other flight conditions, such as landing and takeoff. This enables desired engine operation over a range of flight condition with respect to performance and other operational parameters such as noise levels. In one example, the flow control device 41 defines a nominal converged position for the nozzle exit area 40 at cruise and climb conditions, and radially opens relative thereto to define a diverged position for other flight conditions. The flow control device 41 provides an approximately 20% change in the nozzle exit area 40.

In one example, the flow control device 41 includes multiple hinged flaps 42 arranged circumferentially about the rear of the fan nacelle 34. The hinged flaps 42 can be actuated independently and/or in groups using segments 44. In one example, the segments 44 and each hinged flap 42 can be moved angularly using actuators 46. The segments 44 are guided by tracks 48 in one example. In the example shown, the hinged flaps 42 may be manipulated to change the amount and/or direction of thrust.

Figure 2:
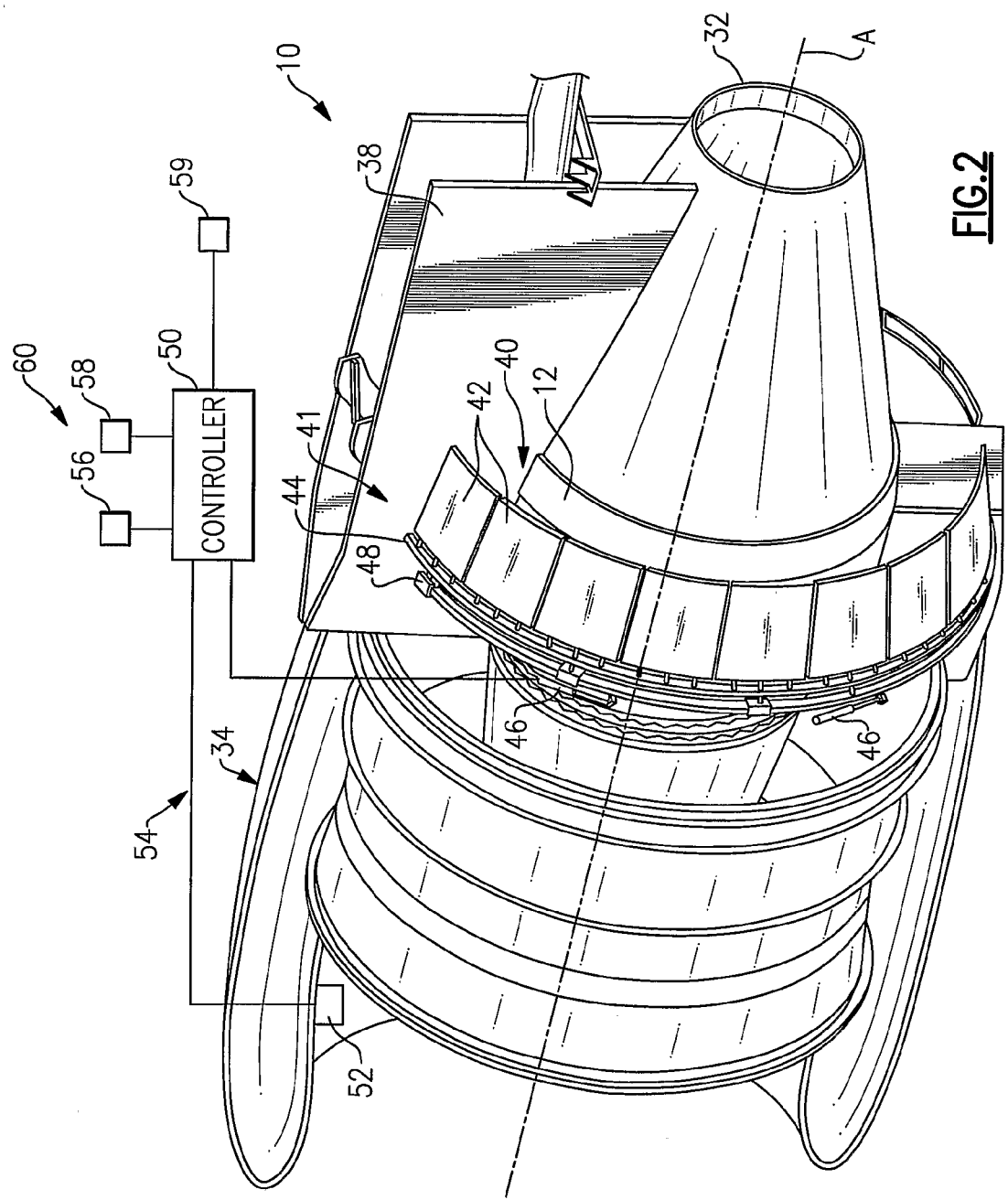
FIG. 2 is a partially broken perspective view of the geared turbofan engine shown in FIG. 1 and including a deicing system.

A deicing system 54 includes a controller 50 that communicates with the actuators 46 to manipulate the flow control device 41 thereby changing the effective nozzle exit area. The controller 50 commands the control device 41 to manipulate the turbofan to avoid ice build up. In the example shown in FIG. 2, the flow control device 41 physically changes the nozzle exit area 40 by moving the hinged flaps 42.

More specifically, effectively changing the nozzle exit area 40 can introduce pressure pulses capable of breaking up any formed ice by modulating back pressure. This can be achieved by rapidly opening and closing the hinged flaps 42 several times. A controlled surge condition introducing mechanical vibrations can also be initiated by the flow control device 41 to break up any ice on the engine 10.

An ice detection sensor 52 in communication with the controller 50 can be used to detect the actual presence of ice in a desired location on the engine 10. The controller 50 initiates a deicing procedure with the control device 41 in response to any detected ice.

Alternatively or additionally, the controller 50 can periodically actuate the flow control device 41 based upon a schedule or conditions that are typically favorable to ice formation. An aircraft icing sensor 60 can be used to provide information to the controller 50 for use with the icing conditions schedules. The aircraft icing sensor 60 includes atmospheric temperature and pressure sensors 56 and 58, in one example. A deicing procedure can also be initiated manually by the pilot using a switch 59, for example.

Although example embodiments of this invention have been disclosed, a worker of ordinary skill in this art would recognize that certain modifications would come within the scope of this invention. For that reason, the following claims should be studied to determine the true scope and content of this invention.

The invention claimed is:

1. A turbofan engine deicing system comprising:
a core nacelle including a core housing a turbine;
a turbofan arranged upstream from the core nacelle;
a fan nacelle surrounding the turbofan and the core nacelle to provide an annular bypass flow path, the annular bypass flow path providing primary thrust and the core providing secondary thrust less than the primary thrust;
a control device having multiple hinged flaps and configured to receive a command, the control device configured to effectively change a nozzle exit area of the annular bypass flow path in response to the command; and
a controller programmed to send the command to the control device in response to detecting an icing condition for avoiding undesired ice buildup on the turbofan engine, wherein the command modulates the control device to rapidly open and close the hinged flaps to break up the ice buildup.

2. The turbofan engine deicing system according to claim 1, wherein the control device is arranged downstream from the turbofan.

3. The turbofan engine deicing system according to claim 2, wherein the control device changes a physical area of the nozzle exit area in response to the command.

4. The turbofan engine deicing system according to claim 1, wherein the control device creates a turbofan surge condition for breaking up the ice buildup.

5. The turbofan engine deicing system according to claim 1, comprising an ice detection sensor for detecting presence of ice on the turbofan engine, the controller communicating with the ice detection sensor and generating the command in response to a signal from the ice detection sensor.

6. The turbofan engine deicing system according to claim 1, wherein the controller includes a schedule having information relating to favorable icing conditions, the controller generating the command in response to detecting the favorable icing conditions.

7. The turbofan engine deicing system according to claim 6, comprising an aircraft icing sensor communicating with the controller and providing the information.

8. The turbofan engine deicing system according to claim 7, wherein the information includes atmospheric pressure and temperature.

9. The turbofan engine deicing system according to claim 1, comprising a switch communicating with the controller for initiation by a pilot, the controller sending the command in response to actuation of the switch.

10. A method of deicing a turbofan engine comprising the steps of:
detecting an icing condition;
providing a control device having multiple hinged flaps that changes an effective nozzle exit area provided by a bypass flow path that extends between core and fan nacelles in response to a command; and
sending the command to the control device in response to detecting the icing condition to prevent ice buildup on the turbofan engine, wherein the command modulates the control device to rapidly open and close the hinged flaps for breaking up the ice buildup.

11. The method of deicing a turbofan engine according to claim 10, wherein the change in effective nozzle exit area is achieved by changing the physical area of the exit nozzle, the exit nozzle provided by a turbofan nacelle surrounding the turbofan and the core nacelle.

12. The method of deicing a turbofan engine according to claim 10, wherein the controller modulates the control device to introduce a pressure pulse that breaks up the ice buildup.

13. The method of deicing a turbofan engine according to claim 10, comprising an ice detection sensor detecting a presence of ice on the turbofan engine, the controller manipulating the turbofan in response to a signal from the ice detection sensor.

14. The method of deicing a turbofan engine according to claim 10, wherein the controller includes a schedule having information relating to favorable icing conditions, the controller manipulating the control device in response to detecting favorable icing conditions.

15. The method of deicing the turbofan engine according to claim 14, wherein the information includes atmospheric pressure and temperature.

16. The method of deicing a turbofan engine according to claim 10, comprising a switch for being initiated by a pilot, the switch in communication with the controller for initiated manipulation of the turbofan.

\* \* \* \* \*